US010465995B1

(12) United States Patent
Henry

(10) Patent No.: US 10,465,995 B1
(45) Date of Patent: Nov. 5, 2019

(54) DEPOSITION PREVENTION BY SWEEP GAS

(71) Applicant: Massachusetts Institute of Technology, Cambridge, MA (US)

(72) Inventor: Asegun Henry, Boston, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 16/381,903

(22) Filed: Apr. 11, 2019

Related U.S. Application Data

(60) Provisional application No. 62/740,664, filed on Oct. 3, 2018.

(51) Int. Cl.
| | | |
|---|---|---|
| *H01L 31/00* | (2006.01) | |
| *F28D 20/02* | (2006.01) | |
| *H02S 10/30* | (2014.01) | |
| *F22B 1/00* | (2006.01) | |
| *F28D 20/00* | (2006.01) | |

(52) U.S. Cl.
CPC .......... *F28D 20/021* (2013.01); *F22B 1/006* (2013.01); *H02S 10/30* (2014.12); *F28D 2020/0082* (2013.01)

(58) Field of Classification Search
CPC .......... F28D 20/021; F28D 2020/0082; F22B 1/006; H02S 10/30
See application file for complete search history.

(56) References Cited

U.S. PATENT DOCUMENTS

| | | | | |
|---|---|---|---|---|
| 5,593,509 A | * | 1/1997 | Zuppero | H02S 10/30 136/253 |
| 2003/0230336 A1 | * | 12/2003 | Malfa | H01G 9/2031 136/253 |
| 2014/0272639 A1 | | 9/2014 | Zietlow | |
| 2016/0197574 A1 | * | 7/2016 | Henry | H02S 10/30 136/201 |
| 2018/0045197 A1 | | 2/2018 | Henry et al. | |
| 2018/0097259 A1 | | 4/2018 | Bradwell et al. | |
| 2018/0122519 A1 | | 5/2018 | Henry et al. | |

FOREIGN PATENT DOCUMENTS

WO WO 2017/184580 A1 10/2017

OTHER PUBLICATIONS

Invitation to Pay Additional Fees for Application No. PCT/US2019/026947 dated Jun. 13, 2019.
Amy et al., Pumping liquid metal at high temperatures up to 1,673 kelvin. Nature. Oct. 11, 2017;550(7675):199-203. doi: 10.1038/nature24054. Suppl Info, 8 pages.

(Continued)

*Primary Examiner* — Angelo Trivisonno
(74) *Attorney, Agent, or Firm* — Wolf, Greenfield & Sacks, P.C.

(57) ABSTRACT

Energy storage systems are disclosed. The systems may store energy as heat in a high temperature liquid, and the heat may be converted to electricity by absorbing radiation emitted from the high temperature liquid via one or more photovoltaic devices when the high temperature liquid is transported through an array of conduits. Some aspects described herein relate to reducing deposition of sublimated material from the conduits onto the photovoltaic devices.

30 Claims, 8 Drawing Sheets

(56) References Cited

OTHER PUBLICATIONS

France et al., Quadruple-junction inverted metamorphic concentrator devices. IEEE J Photovoltaics. Jan. 5, 2015;5(1):432-37.
Geisz et al., 40.8% efficient inverted triple-junction solar cell with two independently metamorphic junctions. Appl Phys Lett. Sep. 2008;93:123505(1-4). doi:10.1063/1.2988497.
Seyf et al., Thermophotovoltaics: a potential pathway to high efficiency concentrated solar power. Energy & Env Sci. Jul. 2016;9:2654-65. doi: 10.1039/c6ee01372d.
Wilk et al., Estimating the cost of high temperature liquid metal based concentrated solar power. J Renewable Sustainable Energy. Mar. 2018;10:023705(1-14). doi: 10.1063/1.5014054.
Wilk, Liquid metal based high temperature concentrated solar power: cost considerations. Master's Thesis. Georgia Institute of Technology May 2016. 168 pages.

\* cited by examiner

DEPOSITION PREVENTION BY SWEEP GAS

CROSS-REFERENCE TO RELATED APPLICATIONS

This application claims the benefit under 35 U.S.C. § 119(e) of U.S. provisional application Ser. No. 62/740,664, entitled DEPOSITION PREVENTION BY SWEEP GAS, filed Oct. 3, 2018, the disclosure of which is incorporated by reference in its entirety.

FIELD

Disclosed embodiments are related to energy storage systems, and more specifically, to energy storage systems configured to store heat in a high temperature liquid.

BACKGROUND

Energy storage systems are used to store energy generated by various energy sources, such as renewable energy sources (e.g., solar, hydroelectric, wind, and/or geothermal sources) and/or other energy sources (e.g., fossil fuels, natural gas, nuclear, coal, etc.). In some applications, energy storage systems are used for grid-scale storage to help balance differences between energy supply and demand. For example, some renewable energy sources may generate energy during periods of low energy demand, and the excess energy may be stored until demand increases, at which time the stored energy may be supplied to meet the increased demand. Various approaches for energy storage include pumped hydroelectric energy storage, compressed air energy storage, and electrochemical energy storage in one or more batteries.

SUMMARY

In one embodiment, an energy storage system comprises a conduit constructed and arranged to transport a liquid, a photovoltaic device, a gap between the conduit and the photovoltaic device, a gas inlet constructed and arranged to direct a sweep gas into the gap, and a gas outlet constructed and arranged to direct the sweep gas out of the gap. A flow of the sweep gas from the inlet to the outlet passes through the gap between the conduit and the photovoltaic device.

In another embodiment, a method comprises transporting a liquid through a conduit positioned on a first side of a gap opposite a photovoltaic device, and flowing a sweep gas through the gap between the conduit and the photovoltaic device.

In a further embodiment, an energy storage system comprises an array of conduits constructed and arranged to transport a liquid from a first end of the array to a second end of the array, a plurality of photovoltaic devices, and a plurality of gaps formed in the array of conduits. Each gap comprises an opening at at least one end of the array of conduits, and each gap is constructed and arranged to receive at least one of the plurality of photovoltaic devices. The plurality of photovoltaic devices are selectively moveable into and out of the plurality of gaps.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
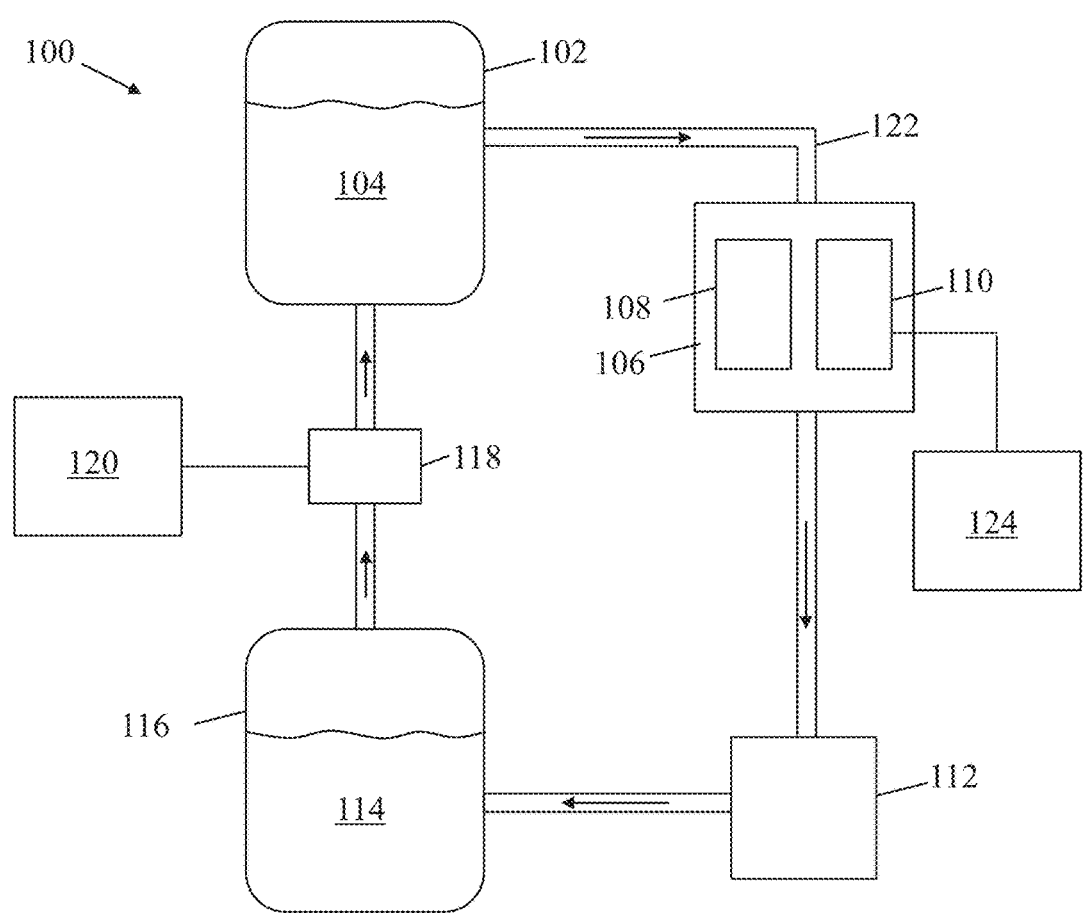
FIG. 1 is a schematic representation of an energy storage and conversion system, according to some embodiments.

Aspects described herein relate to energy storage systems such as, for example, grid-scale energy storage. The inventors have appreciated that while the costs associated with generating energy from many renewable energy sources (e.g., solar and wind) are approaching those associated with conventional energy sources (e.g., fossil fuels), in many cases, renewable energy is not available when it is needed. For instance, generation of solar and wind energy depend on weather conditions. In other cases, the cost of generating energy (including from non-renewable sources) may be lower at times of low energy demand. Accordingly, the inventors have appreciated numerous benefits associated with energy storage systems that can store energy (such as energy created by one or more renewable energy sources and/or energy generated during low cost periods) and release the energy at a later desired time, such as upon an increase in energy demand. In this manner, the energy storage systems described herein may provide for dispatchability of energy generated by various energy sources. While some systems have been developed to provide such grid-scale energy storage, such as pumped hydroelectric systems, and electrochemical systems, the inventors have recognized and appreciated numerous drawbacks associated with these approaches. For example, pumped hydroelectric energy storage systems are limited by geography, and electrochemical systems are often expensive and inefficient.

In view of the above, the inventors have recognized and appreciated numerous benefits associated with energy storage systems that are configured to store energy as heat. In particular, heat storage may be substantially cheaper than electricity storage in electrochemical systems, and is not limited geographically like pumped hydroelectric systems. Moreover, in some instances, the systems described herein may allow for cheaper storage of electricity compared to existing systems, for example, based on the cost per unit energy stored and/or the cost per unit power stored.

In some embodiments, the energy storage systems described herein may store heat in a high temperature liquid, such as liquid silicon, liquid iron, liquid alumina, liquid silica, liquid ferrosilicon, liquid, boron, liquid metal oxides such as iron oxide, liquid salts, oils, or other suitable liquid materials. Energy from one or more energy sources, including renewable and/or non-renewable energy sources may be used to heat the liquid to a first, high temperature, and the liquid may be stored in a first liquid storage tank configured to maintain the liquid at the first temperature. In some applications, the first liquid storage tank may be constructed and arranged to provide a low surface area to volume ratio for the liquid contained therein, which may aid in reducing heat loss from the liquid while the liquid is stored in the first liquid storage tank.

Energy may be recovered from the high temperature liquid via one or more photovoltaic devices. In particular, the high temperature liquid may be transported through a series of conduits, such as pipes, tubes, channels or other constructions. Heat transfer from the liquid to the conduits may heat the conduits to an appropriate temperature to cause the conduits to emit electromagnetic radiation with any appropriate range of wavelengths including, but not limited to visible light (400 nm to 700 nm), infrared radiation (700 nm to 1 mm), and/or any other appropriate range of wavelengths as the disclosure is not so limited. In particular, the conduits may be heated to a temperature sufficient to create a substantial flux of energy radiating from the conduits. For example, in some embodiments, the energy flux radiated from the conduits may be between about 5 10 kW/m$^2$ and about 10 kW/m$^2$, which may correspond to kilowatts or megawatts of power recovered from the systems depending on the particular system sizing. In some instances, these energy fluxes may correspond to the conduits being heated to temperatures between about 1400° C. and about 2600° C., 2000° C. to about 2600° C. or another appropriate range of temperatures.

The radiation emitted from the conduits may be absorbed by one or more photovoltaic devices to convert the radiation into electricity. In this manner, the system may convert energy in the form of heat stored in the liquid into electricity. In some embodiments, the one or more photovoltaic devices may comprise multi-junction photovoltaics, which may provide for absorption of a broader range of wavelengths of radiation, thereby improving the efficiency of the conversion from heat in the liquid to electricity. For example, a multi-junction photovoltaic device may be included in some embodiments of an energy storage system.

In some embodiments, a high temperature liquid transported through the conduits may be at a temperature of between about 1400° C. and about 2600° C. (e.g., about 2400° C. for systems utilizing liquid silicon). To accommodate these high temperatures, the conduits may be formed from a suitable high melting point material with a melting temperature that is greater than a temperature of the high temperature liquid contained therein. Appropriate types of materials may include, but are not limited to, graphite, tungsten, silicon carbide, silicon nitride, aluminum nitride, zirconium carbide, other refractory carbides, nitrides, borides, and/or oxides. However, the inventors have recognized and appreciated that at these high temperatures, the vapor pressure of many materials, including carbon, may be relatively high in comparison to the vapor pressure of the material at room temperature. These elevated vapor pressures may lead to undesirable sublimation or evaporation of the material of the conduits during high temperature operation and recapture of previously stored energy. The sublimated material may subsequently deposit onto any exposed surface at a lower temperature. This may include sublimation of the material and deposition onto the photovoltaic devices of the system, which may block subsequent absorption of radiation by the photovoltaic devices and degrade performance of the photovoltaic device. Indeed, the inventors have appreciated that even very thin layers of material (e.g., as thin as a few atomic layers) deposited onto the photovoltaic devices may drastically degrade the performance of the photovoltaic device. Accordingly, some aspects described herein relate to reducing deposition of sublimated material sublimated onto the photovoltaic devices, which may provide for improved efficiency of the systems, reduced maintenance requirements for the systems (e.g., for cleaning or replacement of the photovoltaic devices), and/or longer system lifetimes. For example, in some instances, the embodiments described herein may provide for systems having an expected lifetime of 30 years or more.

In some embodiments, one or more conduits may be separated from corresponding photovoltaic devices by an intermediate layer, and the intermediate layer may be formed of a material having a lower vapor pressure than a material of the conduits when both are at their elevated operating temperatures (e.g. about a temperature of the high temperature liquid contained in the conduits). In this manner, the intermediate layer may reduce the vapor pressure of material within the systems that may interact with the photovoltaic devices, which may lead to substantially reduced sublimation. The intermediate layer may be formed as a film, one or more tubes, one or more chambers, a wall, foil structures, a coating disposed on one or more conduits, combinations of one or more of the forgoing structures, and/or any other structure that provides a barrier between the conduits and the photovoltaic devices to reduce the vapor pressure adjacent the photovoltaic device and correspondingly reduce deposition of sublimated material onto the photovoltaic devices.

According to some aspects, an intermediate layer between one or more conduits transporting a high temperature liquid and one or more photovoltaic devices may act as a diffusion barrier that physically blocks sublimated atoms from the conduits from diffusing towards and depositing onto the photovoltaic devices. For example, in one embodiment, the one or more conduits may be formed from graphite, and the intermediate layer may be formed from tungsten, and the tungsten intermediate layer may block diffusion of sublimated carbon atoms towards the photovoltaic devices, thereby reducing or substantially preventing undesirable deposition of material onto the photovoltaic devices. Additionally, due to the tungsten, or other intermediate layer, having a reduced vapor pressure as compared to the material of the conduits at these temperatures, the gas space between the barrier and the photovoltaic device will exhibit a reduced partial pressure of sublimated materials as compared to the gas space between the barrier and conduits. Of course, while particular materials are noted above, other materials that may be suitable for the intermediate layer may include, but are not limited to, rhenium, tantalum, and/or alloys of tungsten, rhenium, and/or tantalum, as well as any other appropriate material (e.g., carbides, nitrides, borides, and/or oxides) with a vapor pressure less than a corresponding vapor pressure of a material of the corresponding conduits through which a high temperature liquid is contained.

In addition to providing a lower vapor pressure of sublimated materials adjacent a photovoltaic device, an intermediate layer may also form an emission surface configured to radiate energy (e.g., visible light and/or infrared radiation) towards the photovoltaic devices. For example, the intermediate layer may be positioned adjacent one or more conduits carrying a high temperature liquid, and heat from the conduits may be transferred to the intermediate layer (e.g., via conductive, convective, and/or radiative heating). Upon heating, the intermediate layer may radiate the absorbed energy towards the photovoltaic devices, which may subsequently absorb the radiation and convert it to electricity, as discussed above.

According to some aspects, undesirable deposition of sublimated material from one or more conduits onto one or more photovoltaic devices of a system may be reduced or avoided by removing sublimated atoms from a system before the atoms are able to deposit onto the one or more photovoltaic devices. In some embodiments, such removal of the sublimated material may be achieved by flowing a sweep gas within a gap between the one or more conduits and the one or more photovoltaic devices. The sweep gas may form a moving gas curtain between the one or more conduits and the one or more photovoltaic devices that entrains sublimated atoms and moves the sublimated atoms away from the photovoltaic devices before the sublimated atoms are able to deposit onto the photovoltaic devices. Depending on the particular embodiment, a sweep gas may include any suitable non-reactive gas. For example, a sweep gas may include one or more noble gases such as argon, krypton, and/or xenon, and/or a combination of non-reactive gases. In some applications, heavier gases comprising atoms and/or molecules having larger cross-sections may be preferable to provide improved entrainment of sublimated atoms and corresponding reduced deposition of sublimated atoms compared to sweep gases comprising lighter gases. However, it should be understood that the current disclosure is not limited to sweep gases comprising the specifically disclosed gases as well as heavy atoms and/or molecules.

In some embodiments, a sweep gas may flow into a gap between one or more conduits and one or more photovoltaic devices through a gas inlet, and the sweep gas may flow out of the gap through a gas outlet spaced from the gas inlet. Further, depending on the embodiment, a system may include a plurality of inlets and outlets spaced around and/or along the length of a system. In either case, when flowing out of a gas inlet, the sweep gas may entrain and carry sublimated gas atoms towards a gas outlet where the entrained sublimated gas may be removed from the gap such that the sublimated atoms do not reach the photovoltaic devices. In some instances, the sweep gas may be recycled such that it may be flowed into and out of the gap multiple times. In such embodiments, the sweep gas may pass through a filter after exiting the gap through the gas outlet, and the filter may be configured to remove the sublimated gas atoms from the sweep gas before the sweep gas is directed back to a gas inlet.

According to some aspects, a velocity of a sweep gas within a gap between one or more conduits and the one or more photovoltaic devices of a system may be controlled to reduce and/or avoid deposition of sublimated gas atoms onto the photovoltaic devices. For example, in some embodiments, the velocity of the sweep gas ($v_{sweep}$) may be controlled to be greater than a drift velocity ($v_{drift}$) of any sublimated gas atoms within the gap. In certain embodiments, the velocity of the sweep gas may be controlled based on the geometry of a particular system. For example, a system may include one or more pairs of gas inlets and gas outlets, and each gas outlet may be separated from a corresponding gas inlet by a distance L. Moreover, the gap between the conduits and the photovoltaic devices may have a width w, which may correspond to a minimum distance that a sublimated atom would have to travel to deposit onto the photovoltaic devices. In some such embodiments, the velocity of the sweep gas may be controlled such that $L/v_{sweep} < w/v_{drift}$ (i.e., a time for the sweep gas to travel from a gas inlet to a gas outlet is less than a time for a sublimated atom to diffuse across the gap). Depending on the particular embodiment, suitable velocities for the sweep gas may range from about 0.01 m/s to about 10 m/s (e.g., between about 0.5 m/s to about 3 m/s). For example, such sweep gas velocities may be used in connection with systems having a gap width between about 1 mm and about 1 m. However, it should be understood that other sweep gas velocities and gap spacings may be used, as the current disclosure is not limited in this regard.

Depending on the particular embodiment, a drift velocity of a gas may be determined in any suitable manner to select an appropriate velocity for a sweep gas. In some instances, the drift velocity of a gas (e.g., in a zero-velocity environment) may be determined based on an average temperature of the gas. In some instances, the drift velocity may correspond to a thermal velocity of the gas that may be determined according to classical principles of statistical mechanics, as would be understood by one of ordinary skill in the art. For example, the drift velocity of a gas atom or molecule having a mass m at a temperature T may be defined by a most probable velocity $v=(2k_B T/m)^{1/2}$, a root mean square velocity $v=(3k_B T/m)^{1/2}$, and/or a velocity corresponding to the mean magnitude of the velocities of the gas atoms or molecules $v=(8k_B T/\pi m)^{1/2}$, where $k_B=1.38 \times 10^{-23}$ J/K is the Boltzmann constant. In some embodiments, a velocity of the sweep gas and gap dimension may be selected such that the time for the sweep gas to exit the system is shorter than the expected time for the sublimated atoms to diffuse across the gap using one or more of these thermal velocity values.

In some embodiments, a sweep gas may act as a thermal barrier between the conduits and the photovoltaic devices to aid in avoiding non-radiative heat transfer from the conduits to the photovoltaic devices, which may reduce heating of the photovoltaic devices that might otherwise damage the photovoltaic devices. Notably, the inventors have appreciated that such a reduction in non-radiative heating of the photovoltaic devices due to the sweep gas may not significantly impact the efficiency of the system since the vast majority of heat transfer at the operating temperatures of the systems (e.g., about 2400° C.) occurs via radiative heat transfer. In particular, since the rate of radiative heat transfer scales as temperature to the fourth power compared to conduction and convection, which scale linearly with temperature, radiative heat transfer may be dominant above a particular elevated temperature.

In some embodiments, multiple conduits used to transport the high temperature liquid may be arranged in an array that includes either one or a plurality of gaps constructed and arranged to receive one or more photovoltaic devices, and the one or more photovoltaic devices may be movable into and out of the gaps. For example, when energy generation is desired, one or more of the photovoltaic devices may be moved and/or actuated into a corresponding gap in the array of conduits, and the high temperature liquid may be transported through the conduits to generate electricity via radiation emitted from the conduits and absorbed by the photovoltaic devices, as discussed above. In some embodiments, gaps may be configured as extended channels formed in the array of conduits, and the photovoltaic devices may be formed as extended rods that are insertable into the cavities. The inventors have appreciated that this configuration including movable photovoltaic devices may be beneficial to avoid unnecessary exposure of the photovoltaic devices to elevated temperatures and/or sublimated atoms, which could deposit onto the photovoltaic devices, when electricity generation is not desired. Moreover, in some applications, systems including removable photovoltaic devices may provide for simple maintenance, repair, and/or replacement of one or more photovoltaic devices without taking the entire system offline.

Moreover, the inventors have recognized and appreciated that in some in some instances, one or more photovoltaic devices in an energy conversion system may not absorb all of the electromagnetic radiation that may be emitted from one or more conduits of the system, and that such unabsorbed radiation may lead to undesirable loss of efficiency in the system and/or heating of the photovoltaic devices. Accordingly, the inventors have appreciated numerous advantages associated with systems that include one or more reflective layers constructed and arranged to reflect at least a portion of the radiation not absorbed by the photovoltaic devices back towards the conduits (e.g., towards a gap between the conduits and the photovoltaic devices. For example, in some embodiments, a reflective layer may be provided behind one or more photovoltaic devices in an energy conversion system, and the photovoltaic devices may be positioned between the reflective layer and a gap between the photovoltaic devices and the conduits carrying the high temperature liquid. The reflective layer may be configured to reflect radiation not absorbed by the photovoltaic devices back towards the gap, such that the radiation may subsequently be absorbed by the photovoltaic devices or absorbed by the conduits or other suitable structure within the system to avoid heat loss, which may reduce the efficiency of the system. For example, if the reflected radiation is absorbed by the conduits, it may aid in maintaining the conduits at a higher temperature such that the conduits can continue to emit additional radiation that may subsequently be absorbed by the photovoltaic devices. In some embodiments, the reflective layer may be configured such that its reflectivity spectrum substantially overlaps with the emission spectrum from the conduits (or other suitable emission structures).

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a schematic representation of one embodiment of an energy storage system 100. The system includes a first liquid storage tank 102 constructed and arranged to contain a high temperature liquid 104, such as liquid silicon at a temperature of about 2400° C., or other appropriate temperature as described above. The first liquid storage tank 102 is fluidly coupled to an energy conversion system 106 via pipes 122, which may include any suitable structure for transporting the high temperature liquid 104. The energy conversion system 106 includes one or more, and in some embodiments, an array of conduits 108 through which the high temperature liquid flows. As the liquid flows through the array, the conduits are heated and emit radiation. The emitted radiation is then absorbed by one or more photovoltaic devices 110 to convert the radiation into electricity, which may be delivered to an external system 124.

In some applications, the high temperature liquid 104 may be held in the first liquid storage tank 102 until energy recovery is desired, at which time the high temperature liquid may be transported to the energy conversion system 106. In some embodiments, the first liquid storage tank may be configured to hold a large volume of the high temperature liquid 104, which may advantageously provide a small surface area to volume ratio for the first liquid storage tank. As discussed above, such configurations may aid in avoiding heat loss while the liquid is stored in the first storage tank. In one exemplary embodiment, the first liquid storage tank 102 may have a diameter, or other transverse dimension, of between about 1 m and about 100 m, and a height of between about 1 m and about 100 m. In some embodiments a surface area to volume ratio may be between about 1.2 $m^{-1}$ and about 0.15 $m^{-1}$. In further embodiments, the dimensions of the tank and suitable insulation may be selected such that less than 1% of the energy stored in the high temperature liquid is lost to heat per day.

After exiting the array 108 of the energy conversion system 106, the liquid (now at a lower temperature due to the emission of radiation within the array 108) flows into a pump 112 which pumps the lower temperature liquid 114 into a second liquid storage tank 116. For example, in one embodiment in which the high temperature liquid is liquid silicon at a temperature of about 2400° C., the liquid silicon may be stored at a temperature of about 1900° C. in the second liquid storage tank. In some applications, the pump 112 also may be used to control flow of the high temperature liquid 104 from the first liquid storage tank 102 to the energy conversion system 106. In some embodiments, the pump 112 may be configured to move the liquid from the first liquid storage tank 102 into a first end of the array of conduits 108 of the energy conversion system 106, move the liquid from a second end of the array of conduits into the second liquid storage tank 116; and move the liquid from the second liquid storage tank, through the heater 118, and into the first liquid storage tank 102. Exemplary pumps that may be suitable for pumping the liquid throughout the system 100 are described in US Patent Application Pub. No. 2018/0045197, which is incorporated herein by reference in its entirety.

When energy is provided to the system from an external energy source 120, which may be any appropriate renewable or non-renewable energy source, the lower temperature liquid 114 may be pumped through a heater 118. The heater may use the energy from the external energy source 120 to heat the liquid using any appropriate heating method (e.g. induction heating, resistive heating, etc.) and raise its temperature to that of the high temperature liquid 104. After heating, the high temperature liquid may be pumped into the first liquid storage tank 102 where the liquid may remain until it is pumped through the system to recover electricity as desired.

Figure 2:
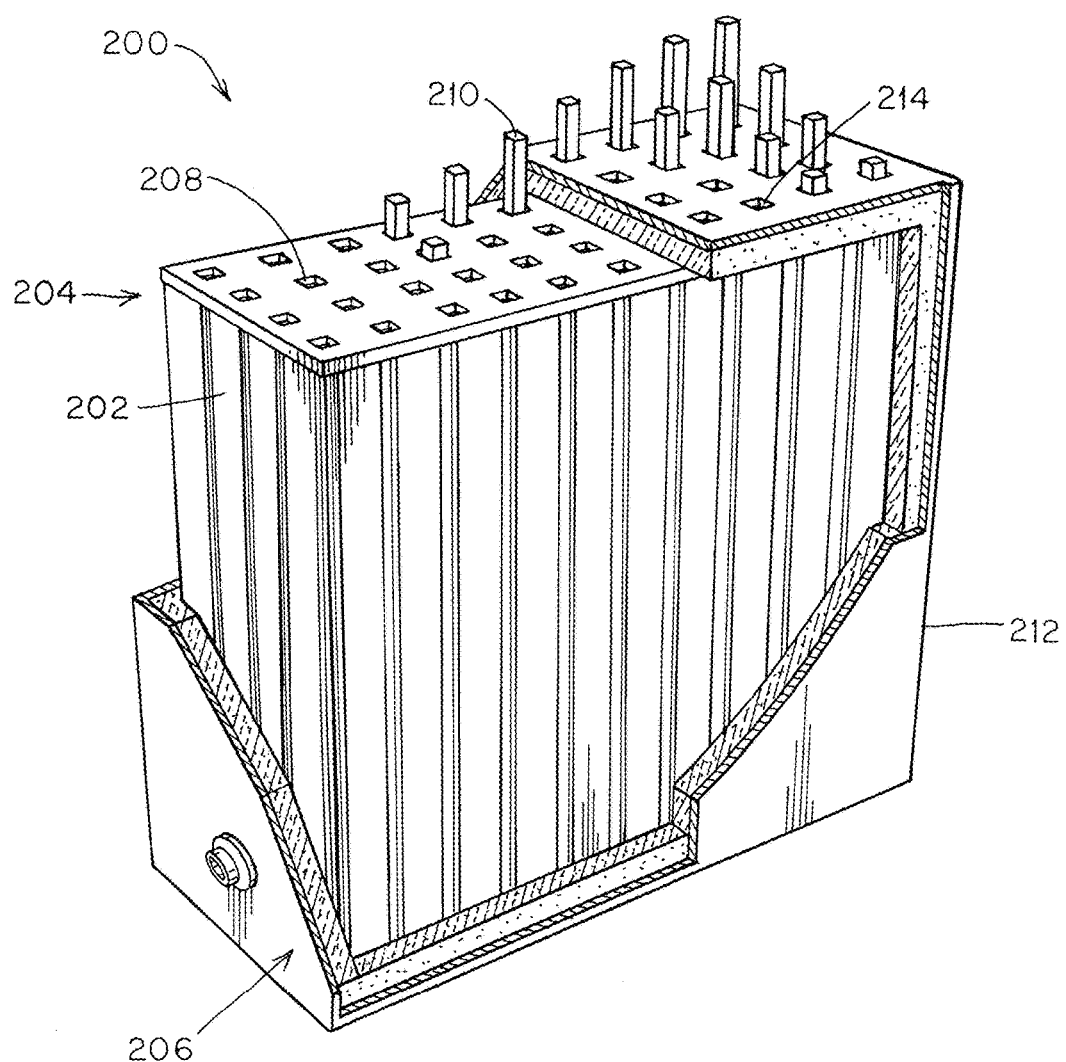
FIG. 2 is a perspective view of an energy conversion system, according to some embodiments.

FIG. 2 shows a perspective view of one embodiment of an energy conversion system 200 including an array of conduits 202 through which a high temperature liquid can flow from a first end of the array 204 to a second end of the array 206. The array 202 includes a plurality of gaps 208, and each gap is constructed and arranged to receive a photovoltaic device 210. The gaps 208 may be formed as open channels extending from the first end of the array 204 toward, and in some embodiments, completely through to the second end of the array 206. In either case, each gap includes at least one end which may be open to the exterior of the array to receive the one or more corresponding photovoltaic devices. The photovoltaic devices 210 may be formed as extended rods such that the photovoltaic devices may extend along at least a portion, and in some embodiments, substantially an entire length of each gap. In some embodiments, the energy conversion system 200 may include a housing 212, and the housing may include openings 214 aligned with the gaps 208 to permit the photovoltaic devices to be inserted into and removed from the array of conduits 202.

Figure 3:
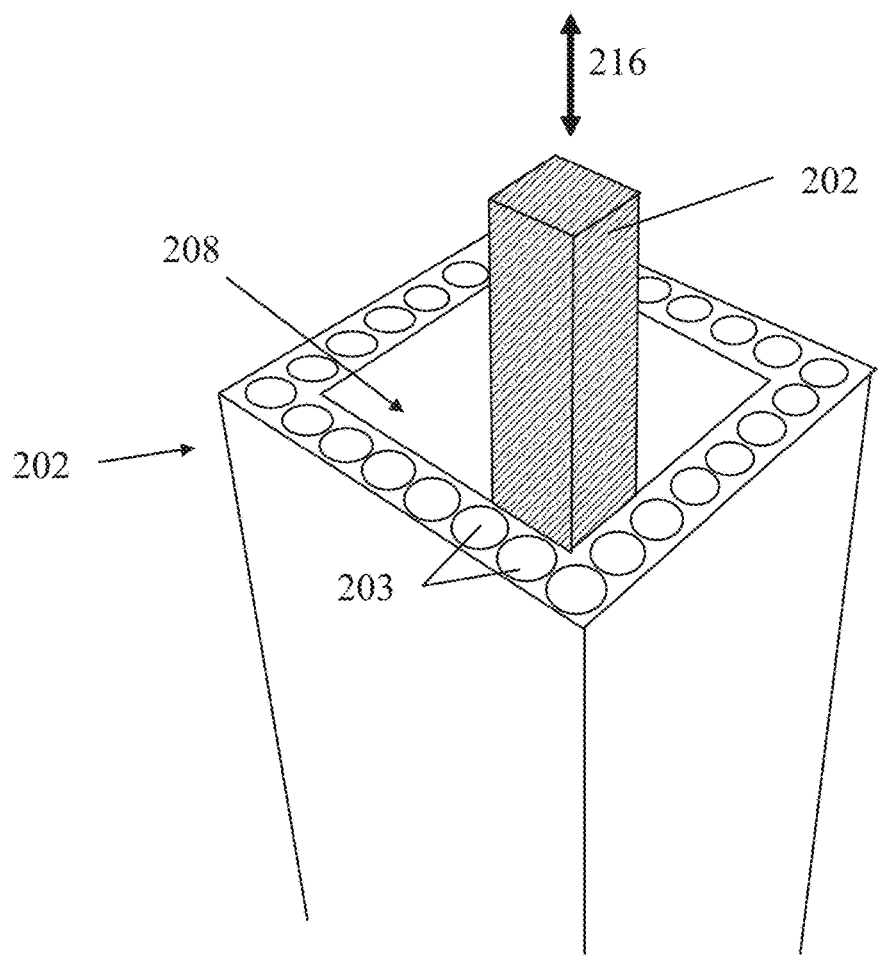
FIG. 3 is a perspective view of a portion of the energy conversion system of FIG. 2.

Referring now to FIG. 3, some aspects of the energy conversion system 200 of FIG. 2 are described in more detail. In particular, FIG. 3 is a perspective view of a portion of the array of conduits 202 showing a plurality of individual conduits 203 arranged to define a gap 208 in which a photovoltaic devices 210 may be received. As illustrated by arrow 216, the photovoltaic device may be selectively inserted into or removed from the gap 208. In particular, the photovoltaic device 202 may extend along a direction parallel to the conduits 203, and the photovoltaic device may be moved along that direction to selectively move the photovoltaic device into, or out of, the gap 208. In some instances, the photovoltaic device may be partially received in the gap such that a portion of the photovoltaic device remains outside of the gap 208. Moreover, while the depicted embodiment includes a photovoltaic device that is movable into and out of a gap, it should be understood that other configurations may be suitable, such as a configuration in which an array of conduits is movable relative to one or more fixed photovoltaic devices to selectively position the photovoltaic devices in gaps of the array of conduits when energy recovery is desired. As discussed above, such arrangements in which the photovoltaic devices are selectively moveable relative to the conduits may be beneficial to avoid unnecessary exposure of the photovoltaic device to the high temperature conditions inside the gap 208 when the system is not recovering previously stored energy, and/or for repair, maintenance, and/or replacement of the photovoltaic device.

While the photovoltaic device 210 is depicted as having a prismatic rod structure with a rectangular cross-section in the above embodiment, it should be understood that other configurations may be suitable. For example, other cross-sectional geometries, such as circular, triangular, or other polygonal geometries may be suitable. Alternatively or additionally, a photovoltaic device 210 may comprise a planar or slab-like structure, a layered structure, and/or may include one or more channels formed through at least a portion of the length of the photovoltaic device. Accordingly, it should be understood that the current disclosure is not limited to any particular shape or geometry of a photovoltaic device and or the corresponding array of conduits. Moreover, while the embodiments shown in FIGS. 2-3 include photovoltaic devices 210 that are removable from the array of conduits 202, other configurations, including configurations in which one or more of the photovoltaic devices are permanently installed in the array, are also contemplated.

Figure 4:
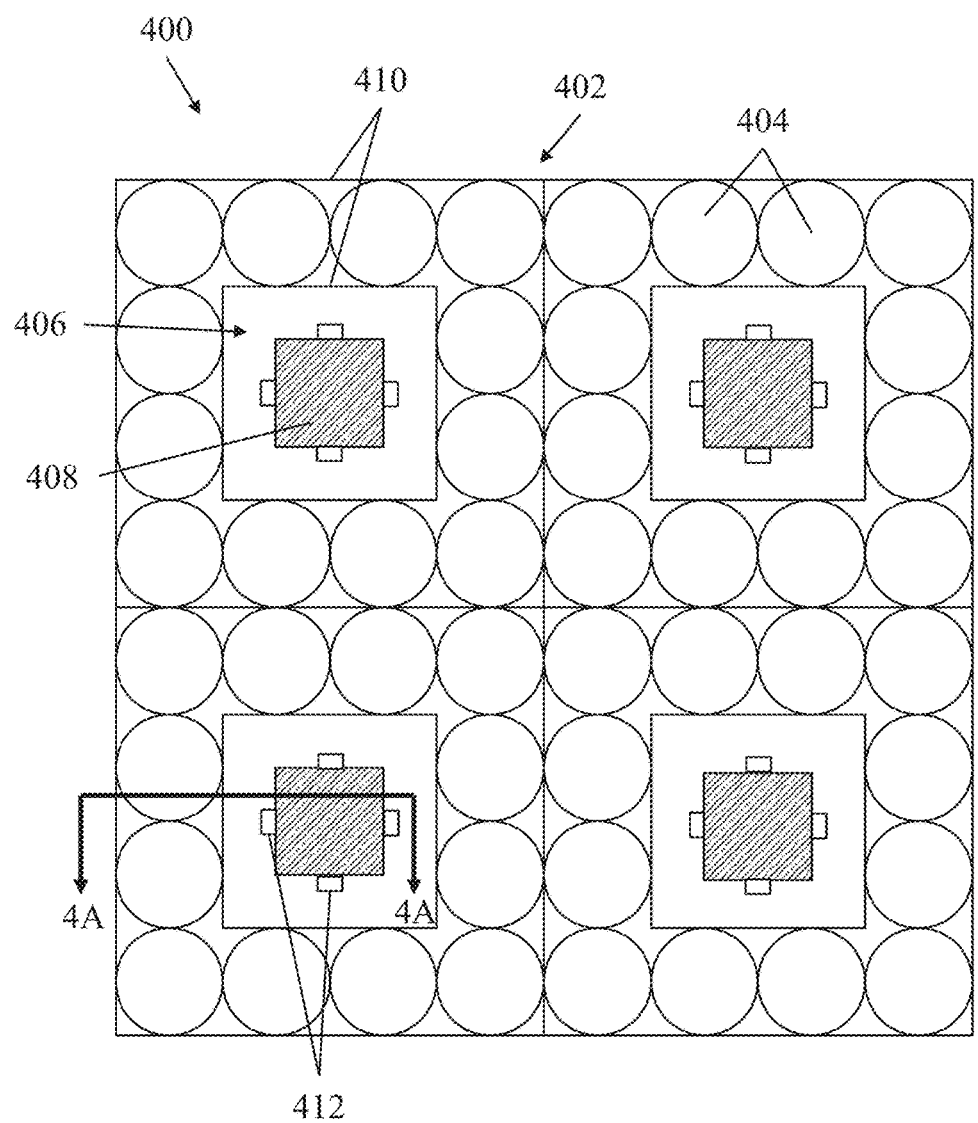
FIG. 4 is a schematic cross-sectional view of a portion of an energy conversion system, according to some embodiments.

FIG. 4 is a cross-sectional top view of one embodiment of an energy conversion system 400 including an array 402 of conduits 404 through which a high temperature liquid may flow, as discussed above. Similar to the embodiment described above, the conduits 404 are arranged to define gaps 406 in which photovoltaic devices 408 may be permanently and/or selectively received.

In the depicted embodiment, intermediate layers 410 are provided between the conduits 404 forming each gap 406 and the corresponding photovoltaic device positioned in the corresponding gap to isolate the photovoltaic devices from the conduits. As discussed above, the intermediate layers may aid in lowering the vapor pressure of sublimated material within the gaps 406. The intermediate layers 410 also may aid in reducing and/or avoiding diffusion of sublimated material from the conduits 404 from diffusing across the gaps 406 and onto the photovoltaic devices 408. For example, the one or more intermediate layers within a system may act as a physical barrier to reduce or prevent diffusion into the gaps 406. As illustrated, in some embodiments, multiple intermediate layers 410 may be arranged such that the conduits 404 are positioned between opposing sections of the intermediate layers to form the overall array structure. In this manner, the intermediate layers 410 may at least partially encase the conduits 404, which may aid in containing sublimated material and avoiding deposition of sublimated material onto the photovoltaic devices 408.

The embodiment depicted in FIG. 4 further includes a plurality of gas flow ports 412 positioned around the photovoltaic devices. As described in more detail below, the gas flow ports 412 may be gas inlets and/or gas outlets through which a sweep gas may flow into or out of the gaps 406, respectively, to entrain and remove any sublimated atoms in the gaps. As illustrated, the gas ports 412 may be located around the photovoltaic devices 408, though other arrangements may be suitable including arrangements of the gas ports on other structures of the system as the current disclosure is not limited to any particular configuration or arrangement of the gas ports.

Figure 4A:
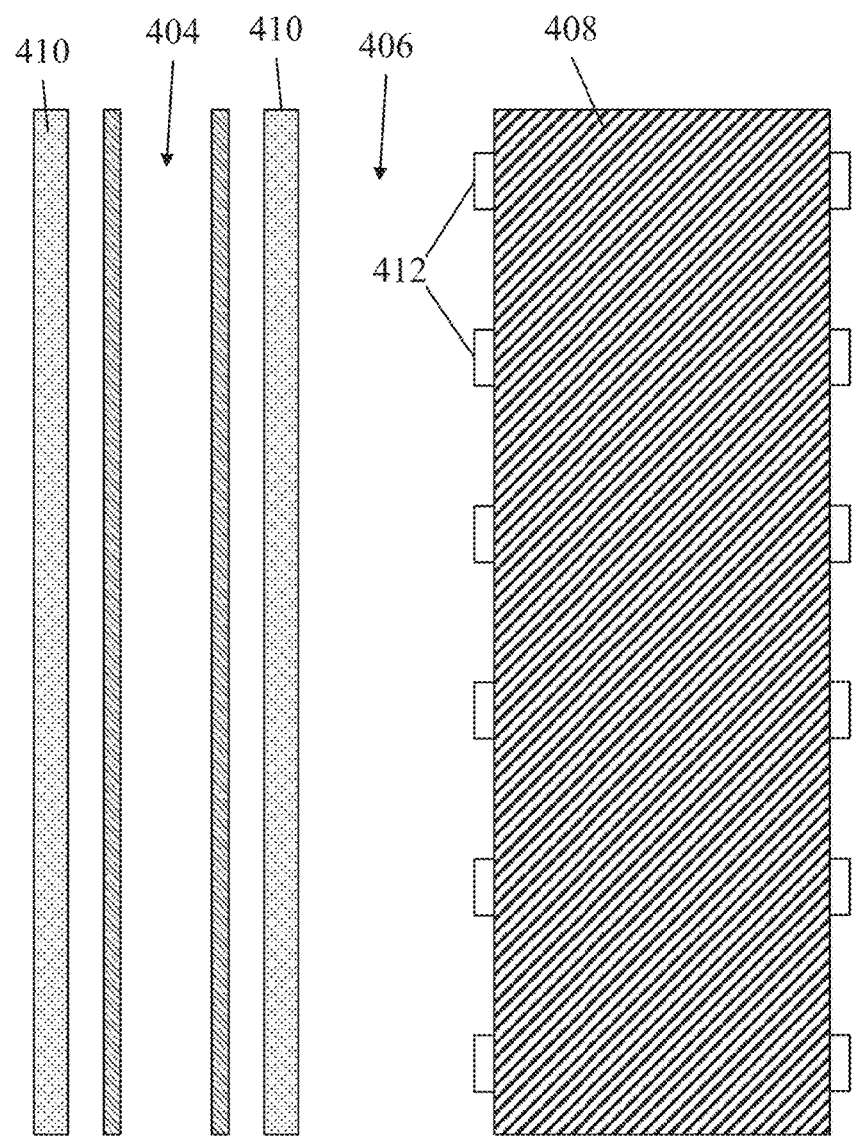
FIG. 4A depicts a portion of the energy conversion system of FIG. 4 along line 4A-4A.

FIG. 4A depicts a cross-sectional view of the energy conversion system 400 taken along line 4A-4A of FIG. 4. In the depicted embodiment, the photovoltaic device 408 may include a plurality of gas ports 412 (such as gas inlet ports or gas outlet ports through which a sweep gas may flow) distributed along its length. Accordingly, it should be understood that a plurality of gas inlet ports may be distributed in any suitable manner around a perimeter and/or along a length and/or width of a photovoltaic device to provide a desired flow geometry for a sweep gas. For example, some embodiments may include gas ports distributed along the length of the photovoltaic devices in combination with gas ports distributed around a circumference, or other external perimeter, of the photovoltaic devices to achieve a desired flow of the sweep gas within a gap. Other embodiments, for example, in which the photovoltaic devices have a more planar geometry, may include gas ports distributed along the length and across the width of the photovoltaic devices.

Figure 5:
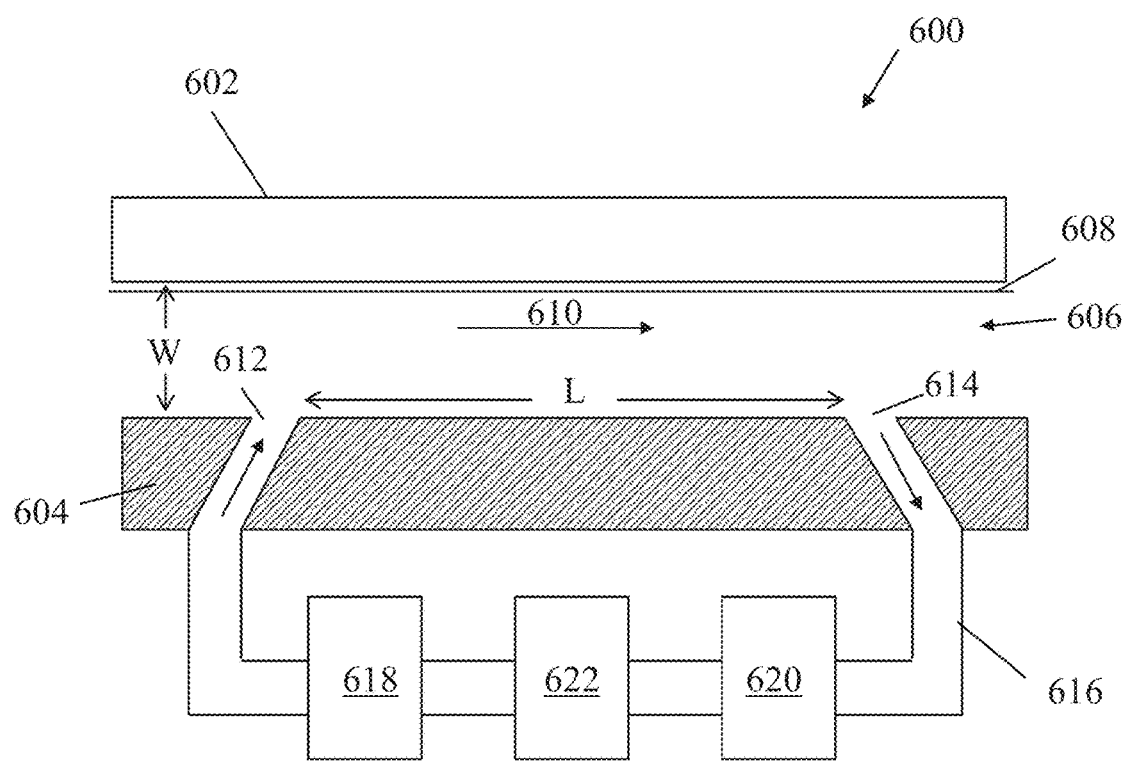
FIG. 5 is a schematic cross-sectional view of a portion of an energy conversion system including a sweep gas system, according to some embodiments.

Referring now to FIG. 5, one embodiment of an energy conversion system 600 including a sweep gas is described in more detail. In the depicted embodiment, conduits 602 are spaced from a photovoltaic device 604 via a gap 606, which has a width W. A flow of sweep gas 610 is formed within the gap by flowing the sweep gas into the gap through a gas inlet 612 and out of the gap through a gas outlet 614 that is formed in the photovoltaic device 604 and spaced from the corresponding gas inlet. While the gas inlet and gas outlet are depicted as channels formed in the photovoltaic device, it should be understood that other configurations may be suitable. For example, some embodiments may include one or more nozzles associated with the inlet or outlet and configured to direct a flow of the sweep gas.

As illustrated, the flow of sweep gas 610 may be directed along a direction from the inlet 612 towards the outlet that is substantially parallel to a direction along which the photoelectric device 604 extends and/or along a length of the gap 606. In other embodiments, the sweep gas may be directed such that at least one component of the velocity of the sweep gas flow is along a length of the photoelectric device and/or along a length of the gap. For example, in such embodiments, another component of the velocity of the sweep gas may be directed along a width of the photoelectric devices which may help to avoid dead zones within the gap where the flow of gas may stagnate.

The flow of the sweep gas 610 within the gap 606 may be driven by a blower 618 configured to impart a desired velocity to the sweep gas. For example, as discussed previously, in some embodiments the velocity of the sweep gas may be selected such that the time for the sweep gas to travel from a gas inlet 612 to a gas outlet 614 is less than a diffusion time for sublimated material from the conduits 602 to diffuse across the gap 606 and deposit onto the photovoltaic device 604. In some instances, a velocity of the sweep gas $v_{sweep}$ may be selected based on a length L between the gas inlet and gas outlet, as well as the width W of the gap. For example, as described above, the sweep gas velocity may be selected such that $L/v_{sweep} < W/v_{drift}$, where $v_{drift}$ is the drift velocity of sublimated material from the conduits. Selecting a sweep gas velocity that satisfies this condition may aid in ensuring that a time for the sweep gas to flow from the gas inlet 612 to the gas outlet 614 is less than the time for sublimated atoms to diffuse across the gap 606. In certain embodiments, the sweep gas velocity may be between about 0.01 m/s and about 10 m/s (e.g., between about 0.5 m/s and about 3 m/s). Moreover in some embodiments, a length between adjacent inlets and outlets may be less than about 500 cm, less than about 100 cm, less than about 500 cm, less than about 10 cm, or less than about 5 cm. In some embodiments, a length between adjacent inlets and outlets may be up to about 5 m. In some instances, an appropriate sweep gas velocity may be set based on the spacing between adjacent inlets and outlets and/or the temperature of a high temperature liquid transported through the conduits.

As illustrated, in some embodiments, the sweep gas 610 may be recycled, such that the sweep gas may be directed to flow out of a gas outlet 614 and back into a gas inlet 612. For example, the sweep gas may flow out of the outlet 614 and through a pipe 616 to a cooler 620 configured to reduce a temperature of the gas exiting the gap 606. For example, the cooler may reduce the temperature of the gas from a first temperature, which may correspond to a temperature of a liquid transported within the conduits 602 (e.g., between about 1800° C. and about 2600° C.), to a second lower temperature (e.g., less than about 1000° C., less than about 500° C., less than about 100° C. less than about 50° C., or less than about 30° C.). In some embodiments in which the photovoltaic device 604 is actively cooled, (e.g., to approximately 35° C. or to another suitable temperature), the cooler may be configured to reduce a temperature of the gas to a temperature below that of the photovoltaic device (e.g., to approximately 30-35° C.). After being cooled, the gas is then passed through a filter 622 that may remove material from the sweep gas, such as sublimated material from the conduits that were entrained by the sweep gas flow. It should be understood that the filter 622 may include any suitable filter material, such as a porous metal, polymeric material, carbon, and/or ceramic material. After filtering, the sweep gas may subsequently pass through the blower 618 to be accelerated to the desired velocity for entry into the gap 606 through the gas inlet 612.

As also shown in FIG. 5, to further reduce a vapor pressure of sublimated gases in the gap, it may be desirable in some embodiments to further include an intermediate layer 608 positioned between the conduits 602 and the photovoltaic device 604. The intermediate layer may aid in reducing diffusion of sublimated material across the gap 606, for example, by forming a diffusion barrier to block diffusion of material from the conduits across the gap. Alternatively or additionally, the intermediate layer may be formed from a material having a lower vapor pressure than a material of the conduit, which may result in less sublimation of material into the gap. This reduced vapor pressure may be used to reduce a corresponding sweep gas velocity, gap width, and/or other appropriate operational parameter due to the correspondingly reduced vapor pressure of sublimated material present in the gap. However, it should be understood that the intermediate layer 608 may not be included in some embodiments, and that the sweep gas flow described above may be sufficient to avoid deposition of sublimated material onto the photovoltaic device 604. For example, embodiments without an intermediate layer 608 may employ a relatively higher velocity sweep gas flow and/or larger gap width to prevent or reduce the deposition of sublimated material.

Figure 6:
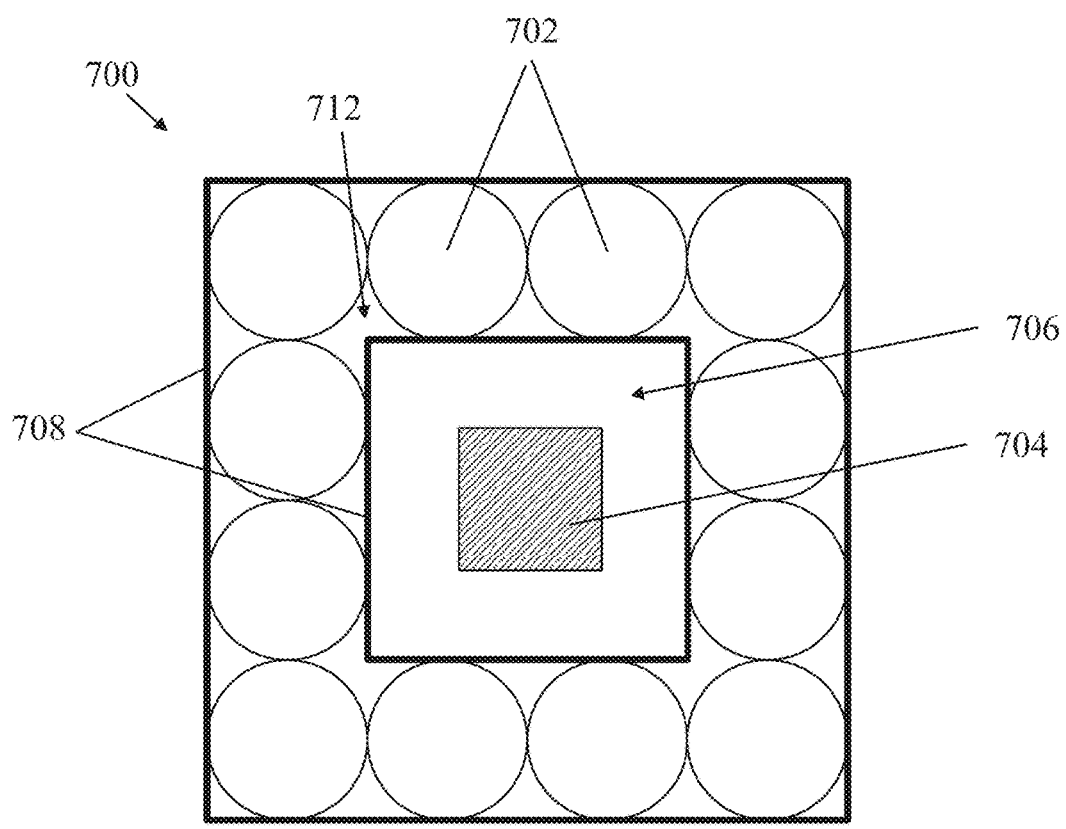
FIG. 6 is a schematic cross-sectional view of a portion of an energy conversion system including a plurality of intermediate layers, according to some embodiments.

Referring now to FIG. 6 aspects related to intermediate layers that may be included in the systems described herein are described in more detail. In particular, FIG. 6 is a cross-sectional top view of a portion of an array 700 of conduits 702, which define a gap 706 in which a photovoltaic device 704 is received. As illustrated, a plurality of intermediate layers 708 may be positioned along opposing sides of the conduits 702. In this manner, at least a portion of the intermediate layers 708 are positioned between the conduits 702 and the gap 706, and in some instances, the intermediate layers may at least partially surround the conduits 702. In some embodiments, the arrangement of the intermediate layers may define one or more conduit regions 712 in which the conduits 702 are positioned, and the intermediate layers may provide a physical barrier between the conduits and the gap 706.

As discussed above, the intermediate layer 708 may be formed from a material having lower vapor pressure than a vapor pressure of a material of the conduits 702 at the elevated operating temperatures of the system. For example, for conduits formed from graphite, the vapor pressure at an exemplary operating temperature of about 2400° C. may be about 10 Pa. The intermediate layer, however, may be formed of a material such as tungsten, which has a vapor pressure well below 1 Pa at this temperature. Accordingly, by placing the intermediate barrier 708 between the conduits and the photovoltaic device 704, the vapor pressure of sublimated material in the gap 706 may be drastically reduced, which may aid in reducing sublimation and corresponding deposition of material onto the photovoltaic device. Additionally, as discussed previously, the intermediate layer 708 may act as physical barrier to prevent or limit diffusion of material from the conduits 702 towards the photovoltaic device 706. For example, any sublimated material from the conduits may be contained between the intermediate layers 708 on either side of the conduits.

As discussed above, in some embodiments, the intermediate layer 708 may further function as an emission surface from which radiation is emitted into the gap 706 towards the photovoltaic device 704. For example, heat from the conduits 702 (e.g., from high temperature liquid flowing through the conduits) may be transferred to the intermediate layer 708 via conduction, convection, and/or radiative heating. Upon heating, the intermediate layer 708 may emit radiation from its surface towards the photovoltaic device.

Depending on the particular embodiment, the conduits 702 and/or intermediate layers 708 may have any suitable dimensions. For example, in some embodiments, wall thickness of the conduits and a thickness of the intermediate layers 708 may be selected based on an expected sublimation rate for the materials of the conduits and intermediate layers at the system's nominal operating temperature. For instance, the thicknesses may be selected such that the conduits and intermediate layers have a useable service life of about 30 years or more. In one exemplary embodiment, the system may include graphite conduits having a wall thickness of between about 1 mm and 1 cm and tungsten intermediate layers having a thickness between about 10 microns and about 5 mm which may provide a service life of approximately 30 years based on the expected sublimation rates of carbon and tungsten at the operating temperature of the array 700.

Figure 7:
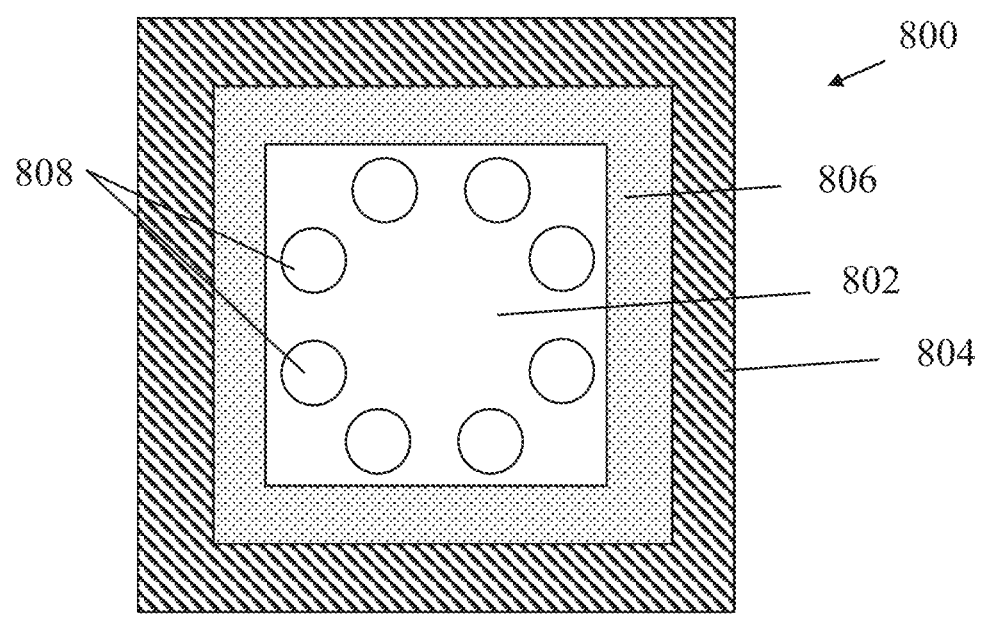
FIG. 7 is schematic cross-sectional view of a photovoltaic device, according to some embodiments.

Referring now to FIG. 7, one embodiment of a photovoltaic device 800 is described in more detail. In particular, FIG. 7 depicts a cross-sectional view of a photovoltaic device that is formed as a prismatic rod, which may, for example, extend along a length of an array of conduits as discussed above. The photovoltaic device 800 includes a central core 802, around which one or more photovoltaic layers 804 are provided on the one or more exterior surfaces of the central core. The photovoltaic layers 804 may include one or more photovoltaic cells configured to convert radiation (e.g., visible light and/or infrared radiation) into electricity. Various configurations of photovoltaic cells may be suitable, including one or more multi-junction photovoltaic cells, single junction photovoltaic cells, and/or combinations of different types of photovoltaic cells selected to provide a desired absorption spectrum. While a photovoltaic device configured as a prismatic rod is depicted, it should be understood that other configurations may be suitable. For example, the photovoltaic device may have a prismatic structure having other cross-sectional shapes (such as triangles, rectangles, other regular or irregular polygons, circles, ovals, etc.), or the photovoltaic device may have a planar configuration (e.g. with photovoltaic layers positioned on one or both sides of a substantially flat planar structure. Accordingly, it should be understood that the current disclosure is not limited to any particular shape and/or configuration for the photovoltaic devices.

In some embodiments, a reflective layer 806 may be provided under the one or more photovoltaic layers 804 such that it is disposed between the central core, or other underlying supporting surface, and the one or more photovoltaic layers. For example, the reflective layer 806 may be configured to reflect radiation not absorbed by the photovoltaic layer 804 back into a gap and towards one or more conduits carrying a high temperature liquid (not depicted in FIG. 8). The reflective layer 806 may be formed of any suitable reflective material, and in some embodiments, the material may be selected to provide a reflectance spectrum that at least partially, and in some embodiments, substantially includes a corresponding emission spectrum of radiation emitted by the conduits. In some instances the reflected radiation may be reabsorbed by the high temperature liquid (e.g., after being absorbed by the conduit), which may aid in maintaining the temperature of the liquid and avoiding energy loss. In other instances the reflected radiation may be subsequently absorbed by the photovoltaic layer 804 after reflecting off of one or more additional surfaces, such as a surface of an intermediate layer in an array of conduits (not depicted).

In some applications it may be desirable to maintain a desired operating temperature of a photovoltaic device. Accordingly, as illustrated in FIG. 8, a photovoltaic device may further include one or more cooling channels 808 formed within the central core 802 or other portion of the device, and a cooling fluid below a desired operating temperature of the photovoltaic device may be flowed through the cooling channels. In this manner, the cooling channels may aid in cooling the one or more photovoltaic layers 806 to maintain a desired operating temperature such that the one or more photovoltaic layers do not become damaged upon exposure to the elevated temperatures associated with the high temperature liquids flowing through the conduits. In one exemplary embodiment, the cooling fluid may comprise water at a temperature of approximately 35° C. and the water may flow through the cooling channels at an appropriate volumetric flow rate for a given size system to provide an appropriate degree of cooling of the photovoltaic layers. It should be appreciated that the central core may include any suitable arrangement of cooling channels, as the current disclosure is not limited in this regard. Moreover, in some instances the reflective layer may aid in avoiding undesired heating of the photovoltaic device by avoiding heat absorption by the photovoltaic device 800, for example by reflecting non-absorbed radiation away from the photovoltaic device.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An energy storage system comprising:
a conduit constructed and arranged to transport a liquid;
a photovoltaic device;
a gap between the conduit and the photovoltaic device;
a gas inlet constructed and arranged to direct a sweep gas into the gap; and
a gas outlet constructed and arranged to direct the sweep gas out of the gap, wherein a flow of the sweep gas from the inlet to the outlet passes through the gap between the conduit and the photovoltaic device.

2. The energy storage system of claim 1, wherein a temperature of the liquid is between about 1400° C. and about 2600° C.

3. The energy storage system of claim 1, wherein a component of a velocity of the sweep gas along a first direction between the gas inlet and the gas outlet is greater than a drift velocity of gas within the gap.

4. The energy storage system of claim 3, wherein the gas inlet and gas outlet are separated by a first distance, the conduit and photovoltaic device are separated by a second distance, and wherein the first distance divided by the component of the velocity of the sweep gas along the first direction is less than the second distance divided by the drift velocity of gas within the cavity.

5. The energy storage system of claim 3, wherein the photovoltaic device extends along the first direction.

6. The energy storage system of claim 1, wherein the sweep gas comprises at least one selected from the group consisting of argon, krypton, and xenon.

7. The energy storage system of claim 1, wherein the photovoltaic device comprises a multi-junction photovoltaic cell.

8. The energy storage system of claim 1, wherein the conduit is formed from graphite.

9. The energy storage system of claim 1, wherein the liquid comprises silicon or ferrosilicon.

10. The energy storage system of claim 1, further comprising a reflective surface, wherein the photovoltaic device is positioned between the reflective surface and the gap.

11. The energy storage system of claim 10, wherein the reflective surface is constructed and arranged to reflect at least a portion of radiation not absorbed by the photovoltaic device towards the gap.

12. The energy storage system of claim 1, further comprising a filter coupled to the gas inlet and the gas outlet.

13. The energy storage system of claim 12, wherein the sweep gas is directed out of the gas outlet, through the filter, and back into the gas inlet.

14. A method comprising:
transporting a liquid through a conduit positioned on a first side of a gap opposite a photovoltaic device; and
flowing a sweep gas through the gap between the conduit and the photovoltaic device.

15. The method of claim 14, further comprising:
heating the conduit, at least in part, due to the transport of the liquid through the conduit;
emitting radiation from the conduit into the gap, at least in part, due to the heating of the conduit; and
absorbing at least a portion of the emitted radiation with the photovoltaic device.

16. The method of claim 15, further comprising reflecting at least a portion of the radiation not absorbed by the photovoltaic device back towards the gap.

17. The method of claim 14, wherein flowing the sweep gas through the gap comprises directing the sweep gas into the gap through a gas inlet and directing the sweep gas out of the gap through a gas outlet.

18. The method of claim 17, further comprising:
flowing the sweep gas through a filter after the sweep gas flows out of the gap through the gas outlet; and
flowing the sweep gas from the filter to the gas inlet.

19. The method of claim 14, wherein the sweep gas comprises at least one selected from the group consisting of argon, krypton, and xenon.

20. The method of claim 14, wherein the liquid transported through the conduit has a temperature between about 1800° C. and about 2600° C.

21. The method of claim 14, wherein a velocity of the sweep gas within the gap is greater than a drift velocity of gas within the gap.

22. An energy storage system comprising:
an array of conduits constructed and arranged to transport a liquid from a first end of the array to a second end of the array;
a plurality of photovoltaic devices; and
a plurality of gaps formed in the array of conduits, each gap comprising:
an opening at at least one end of the array of conduits, wherein each gap is constructed and arranged to receive at least one of the plurality of photovoltaic devices, wherein the plurality of photovoltaic devices are selectively moveable into and out of the plurality of gaps.

23. The energy storage system of claim 22, further comprising one or more gas inlets constructed and arranged to direct a sweep gas into at least one gap of the plurality gaps.

24. The energy storage system of claim 23, further comprising one or more gas outlets constructed and arranged to direct the sweep gas out of the at least one gap.

25. The energy storage system of claim 24, wherein a flow of the sweep gas from the one or more gas inlets to the one or more gas outlets is at least partially directed along a length of the at least one gap.

26. The energy storage system of claim 22, wherein the liquid cools from a first temperature at the first end of the array to a second temperature at the second end of the array.

27. The energy storage system of claim 26, wherein the first temperature is between about 1400° C. and about 2600° C.

28. The energy storage system of claim 27, wherein radiation is emitted into the plurality of gaps, at least in part, due to the cooling of the liquid.

29. The energy storage system of claim 26, further comprising:
a first liquid storage tank fluidly coupled to the first end of the array of conduits and constructed and arranged to store the liquid at the first temperature;
a second liquid storage tank fluidly coupled to the second end of the array of conduits and the first tank, the second liquid storage tank constructed and arranged to store the liquid at the second temperature; and
a heater positioned between the first tank and the second tank, the heater constructed and arranged to heat the liquid from the second temperature to the first temperature.

30. The energy storage system of claim 29, further comprising a pump configured to:
move the liquid from the first liquid storage tank into the first end of the array of conduits;
move the liquid from the second end of the array of conduits into the second liquid storage tank; and
move the liquid from the second liquid storage tank, through the heater, and into the first liquid storage tank.

* * * * *

UNITED STATES PATENT AND TRADEMARK OFFICE
CERTIFICATE OF CORRECTION

| | | |
|---|---|---|
| PATENT NO. | : 10,465,995 B1 | Page 1 of 1 |
| APPLICATION NO. | : 16/381903 | |
| DATED | : November 5, 2019 | |
| INVENTOR(S) | : Asegun Henry | |

It is certified that error appears in the above-identified patent and that said Letters Patent is hereby corrected as shown below:

In the Specification

At Column 1, please add the following paragraph before the paragraph CROSS-REFERENCE TO RELATED APPLICATIONS:
FEDERALLY SPONSORED RESEARCH
This invention was made with government support under DE-AR0001005 awarded by the U.S. Department of Energy. The government has certain rights in the invention.

Signed and Sealed this
Seventh Day of February, 2023

Katherine Kelly Vidal
*Director of the United States Patent and Trademark Office*